Nov. 16, 1965   R. J. ANETSBERGER   3,217,633
SEMI-TUBE FRYERS
Filed April 24, 1961   4 Sheets-Sheet 1

INVENTOR.
Richard J. Anetsberger
BY Horton, Davis,
Brewer and Brugman
Attys

Fig. 5

INVENTOR.
Richard J. Anetsberger
BY Horton, Davis,
Brewer and Brugman
Attys

Nov. 16, 1965    R. J. ANETSBERGER    3,217,633
SEMI-TUBE FRYERS
Filed April 24, 1961    4 Sheets-Sheet 4

INVENTOR.
Richard J. Anetsberger
BY Horton, Davis,
Brewer and Brugman
Attys

United States Patent Office 3,217,633
Patented Nov. 16, 1965

3,217,633
SEMI-TUBE FRYERS
Richard J. Anetsberger, Northbrook, Ill., assignor to Anetsberger Brothers, Inc., Northbrook, Ill., a corporation of Illinois
Filed Apr. 24, 1961, Ser. No. 105,214
13 Claims. (Cl. 99—327)

This invention relates in general to food preparation, and more particularly to deep fat fryers.

A principal object of the invention is to materially decrease the heat recovery time in a deep fat fryer. With the cooking fat at a predetermined temperature, immersion therein of the food to be fried causes an immediate reduction in the fat temperature. Operation of the burners employed will bring the fat back up to the predetermined temperature, and the interval between food immersion and return of the fat to such predetermined temperature is referred to as the heat recovery time. That has been very materially reduced with the instant invention by providing a novel cooking kettle and burner construction which results in faster and more efficient transfer of heat to the cooking fat.

Attempts to decrease the heat recovery time have been made by extending heating tubes through the cooking kettle and increasing the B.t.u. input. However, in addition to being wasteful and inefficient, such tube fryers are extremely difficult to clean and service and make the supporting structure and ambient air uncomfortably hot.

Another important object of this invention therefore is to facilitate cleaning and other servicing of a deep fat fryer and to maintain all exposed surfaces at a sufficiently low temperature to enable hand wiping at any time, while, at the same time, obtaining the desired reduction in heat recovery time efficiently.

These objects are attained by providing a semi-tube fryer comprising a kettle having a bottom portion with parallel, inverted channels sloping upwardly from front to rear and defining open-top troughs therebetween, and burner means disposed below the channels and directing their heat into them. In the specific embodiment herein illustrated, those channels slope at an angle of approximately 5 degrees above the horizontal, are closed at their front ends, which are spaced rearwardly from the front wall of the kettle, and open at their rear ends into a vertical exhaust flue. The burner means therein comprises a plurality of upstanding Bunsen-type burners under each channel, each of which is inclined rearwardly at about 27 degrees from the vertical to define an acute angle of approximately 58 degrees with the slope of the channels. It also is preferred that the walls defining the sides of each of the channels be tilted toward each other from bottom to top so that the open-top troughs disposed between the channels increase in width upwardly, which facilitates the desired heat transfer from the burners to the cooking fat.

Another object is to increase the efficiency of a gas-fired deep fat fryer. In addition to the previously described structure and arrangement of the parts illustrated, this is accomplished by housing the kettle and burners within, and in spaced relationship to, a cabinet; providing air inlet means in the bottom of the cabinet to supply ample quantities of primary and secondary air to all of the burners; and mounting radiant fin means within the inverted channels of the kettle bottom to insure complete combustion of the fuel before the products of combustion reach the exhaust flue. This also enables the flue to exhaust directly into the room housing the fryer without any deleterious effects.

A further important object of the invention is to insure maximum life of the cooking fat in a deep fat fryer by providing a relatively cool zone at the bottom front portion of the kettle in which detached food particles will be collected. This prevents burning of such food particles, which would adversely affect the cooking fat, and also facilitates removal of the food particles from the kettle. The kettle construction of the illustration embodiment has the inverted channels terminating at their front ends in spaced relationship to the front wall of the kettle, the space thus defined at the lower front end of the kettle comprising the cool zone, with the burners all being disposed rearwardly thereof. This, plus the upward sloping of the channels from front to rear, causes convection currents in the cooking fat circulating in a counterclockwise manner, as viewed from the right-hand side of the fryer, which carry detached food particles to the lowest point at the front of the kettle in the cool zone.

Another important object of the invention is to insure proper deep fat frying in a single operation, including thorough cooking of the interior of the product to prevent sogginess and obtain interior crispness, and uniform browning and crisping of the exterior of the product. This is accomplished with the semi-tube fryer of my invention hereinbefore described by providing therein timer means selectively settable manually for operation for a predetermined period of time to maintain the burners turned off, and automatically operable at the end of the selected period to turn the burners on. Initiating operation of this burner or precook timer means results in the initial thermostat-controlled temperature of the fat dropping, due to immersion therein of the relatively cold product to be fried, which allows the interior of the latter to be cooked and moisture to be released therefrom without prematurely browning its exterior. Immediately following the automatic turning on of the burners, the fat is heated very rapidly to its initial temperature. This enables completion of the frying and thorough exterior browning and crisping of the product in a minimum overall time.

A further important object of the invention is to facilitate programmed deep fat frying by providing mechanism for automatically subjecting food that is to be fried to a complete cooking cycle comprising separate phases, each of which includes variables, such as with respect to time or temperature, that may be preselected.

Another important object is to enable automatic handling of the food to be fried by incorporating into a deep fat fryer means for immersing the food in the heated fat and removing the same therefrom at the end of a selectable predetermined time interval. In the embodiment of the invention herein illustrated, this means includes a food-receiving basket support which is vertically movable to lower and raise the basket in response to operation of an electric motor, in turn controlled by a selectively settable cycle timer.

A further important object of the invention is to make such food moving means and burner timer means selectively presettable so as to effect maximum and uniform production of variable quantities of different kinds of food in a deep fat fryer.

Numerous other objects and advantages of the invention will be apparent as it is better understood from the following description, which, when taken in connection with the accompanying drawings, discloses a preferred embodiment thereof.

Figures 1, 2, 3:
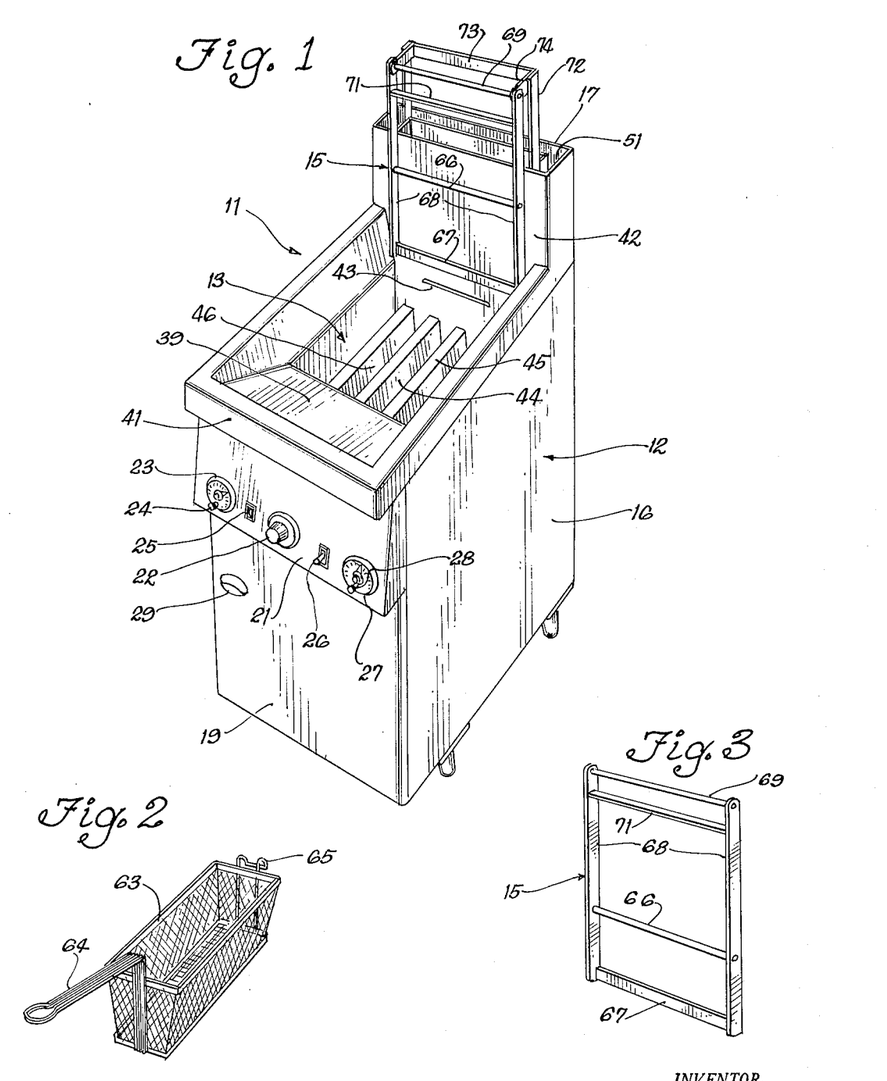
FIGURE 1 is a perspective view of a semi-tube, deep fat fryer embodying the features of this invention.
FIG. 2 is a perspective view of a basket that may be employed with the fryer of FIG. 1.
FIG. 3 is a view of the basket hanger frame.

Referring more particularly to FIG. 1, reference numeral 11 indicates in general a semi-tube, deep fat fryer embodying the features of my invention which comprises an outer casing 12, and a kettle 13 and burner means 14 (FIG. 4) disposed therein. This preferred embodiment of the invention also includes food supporting means indicated generally by reference numeral 15 for lowering and raising food to be fried into and out of the kettle 13, and various controls for the burner and food supporting means which will be described in detail hereinafter.

Figure 4:
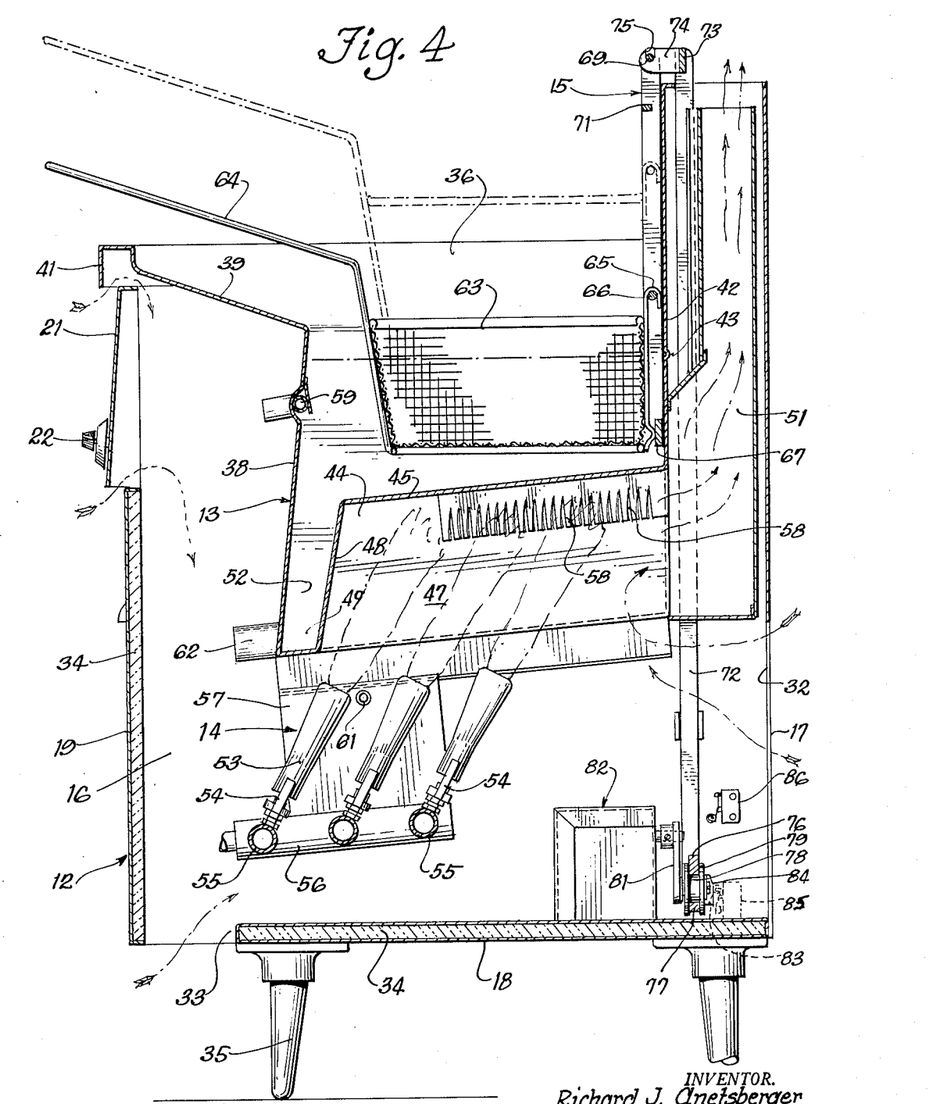
FIG. 4 is a vertical sectional view taken through the fryer of FIG. 1, as seen from the right side thereof, showing the food supporting means and basket of FIG. 2 in full lines of their lowermost, active positions.
Figure 5:
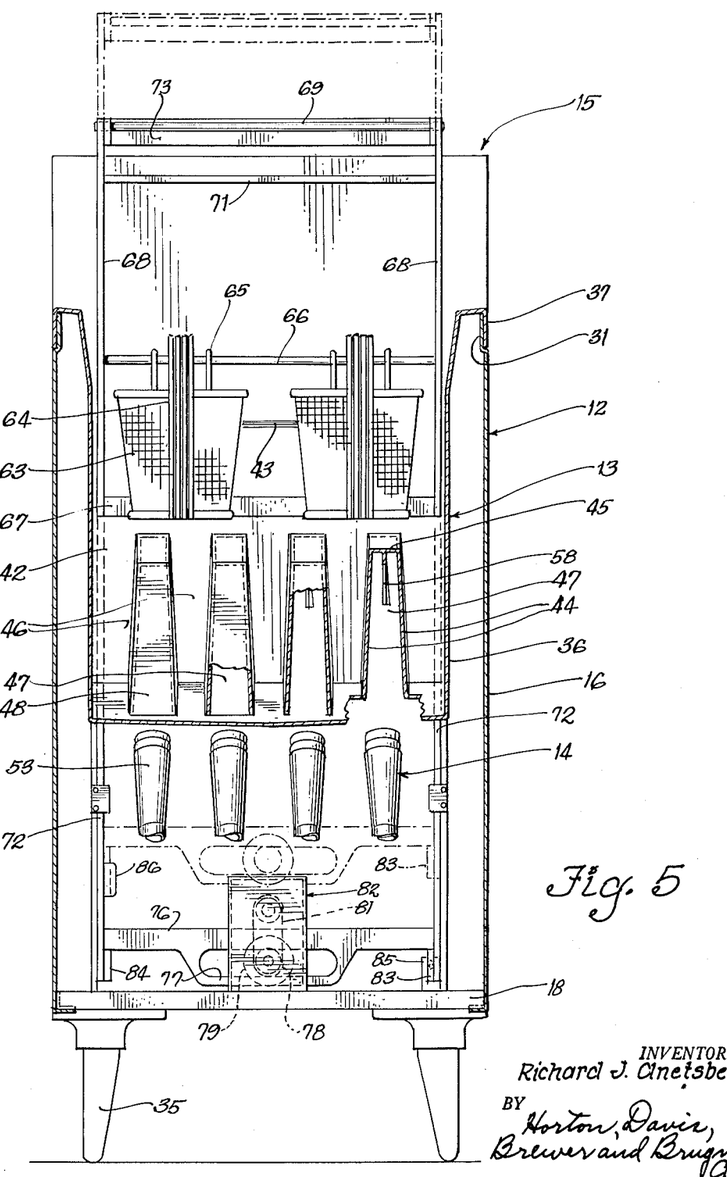
FIG. 5 is a vertical sectional view taken through the frayer of FIG. 1, as seen from the front side thereof.

The casing 12 is made up of side walls 16 (FIGS. 1 and 5), a rear wall 17 (FIG. 4), a bottom 18 and a front comprising a door 19 surmounted by a control panel 21. Mounted on the latter (FIG. 1) are a thermostat control 22, a cycle timer 23 which includes a manually operable starter button 24, a heat indicating light 25, a master switch 26, and a precook or burner-off timer 27 having a manually operable starter button 28. The front wall door 19 is provided with a suitable latch handle 29 for normally retaining the same closed and operable to open the door to give ready access to the interior of the casing. As best seen in FIG. 5, each of the side walls 16 terminates at its upper end in an inwardly offset flange 31 to define a horizontally disposed shelf for supportingly engaging the side walls of the kettle 13 in a manner later to be described. The rear wall 17 preferably is provided with an aperture 32 (FIG. 4), and the bottom 18 has an aperture 33 at its front end for supplying air to the burner means 14. It is preferred that all of these several parts of the casing be constructed from stainless steel, although any other suitable material may be employed, and secured together as a unitary structure in well known manner. It also is preferred that the bottom 18 and front door 19 be provided with insulation means, as in the form of insulating panels 34 which may be mounted thereon by means of suitable marginal flanges formed on the metal panels. It also is advantageous to form the control panel 21 as shown in FIG. 4 with the main panel thereof disposed at an angle to the vertical, or sloping downwardly and forwardly, and terminating at its lower edge in slightly spaced relationship relative to the upper edge of the door 19 to facilitate flow of air from the outside of the casing into the space between its front wall and the kettle 13. The upper edge of the control panel 21 also preferably is disposed in spaced relationship to the front edge portion of the kettle, so that air similarly may flow therebetween from the exterior of the casing into the space between its front wall and the kettle. This arrangement results in the control panel being maintained at substantially room temperature at all times and greatly assists in maintaining the upper shelf or apron portion of the kettle (to be later described) at a sufficiently low temperature to enable hand wiping thereof at all times. Since it is desirable to have the casing 12 spaced upwardly from the floor or other supporting surface, suitable supporting means are provided in the form of legs 35 which are secured to the casing in well known manner and may be vertically adjustable to effect leveling of the fryer.

The kettle 13 comprises a unitary structure which, like the casing 12, preferably is made up of separate parts of stainless steel secured together in any well known manner. The kettle 13 comprises lateral side walls 36 which, as shown in FIG. 5, flare slightly outwardly adjacent their upper ends and terminate in depending edge flanges 37 adapted to engage the associated flanges 31 on the casing side walls 16 and seat upon the horizontal shelves formed by the latter to support the kettle interiorly of, and in spaced relationship relative to, the casing 12. The kettle 13 also includes a front wall 38 which slopes forwardly and upwardly adjacent its upper end to provide an inclined apron 39 formed as best seen in FIG. 4 and terminating at its forward edge in a depending flange 41. This flange 41 is spaced slightly forwardly of the control panel 21 to enable flow of air from the exterior of the casing over the control panel and into contact with the apron 39. The kettle 13 further includes a rear wall 42 which may be provided with a scored line 43 to give a visual indication of the normal level at which liquid cooking fat should be maintained in the kettle.

The bottom portion of the kettle 13 incorporates specifically novel features of this construction and is formed, as by bending of an initially flat sheet, to provide a plurality of pairs of upstanding walls 44 joined at their upper ends by transversely extending portion 45 to define open-top troughs 46, extending from front to rear of the kettle, and inverted channels 47 interposed therebetween. These troughs and channels formed by the walls 44, 45 terminate at their forward ends short of, and in spaced relationship to, the front wall 38 of the kettle, and the walls 44 of each pair are joined along their forward edges by transverse wall sections 48 which define the forward ends of the channels 47. The lower, forward portion of the kettle bottom is completed by a transversely extending, substantially horizontal wall 49, and the rear wall 42 of the kettle is so shaped as to extend downwardly from the upper portions 45 of the kettle bottom to the bottoms of the troughs 46 to close the latter. The rear ends of the channels 47 thus remain open and communicate with a substantially vertical flue 51 which is otherwise closed, except for its open upper end. This construction provides a "cool zone" at the lower forward part of the kettle 13 between the forward ends 48 of the inverted channels 47 and the front wall 38, which is designated in FIG. 4 by reference numeral 52. To facilitate transferring heat to cooking fat in the kettle and generating convection currents therein passing in a counterclockwise direction through this cool zone 52, as seen from the right side of the fryer in FIG. 4, the walls 44 of each pair are inclined toward each other from the bottom upwardly (FIG. 5), so that the open-top troughs 46 become progressively wider laterally from bottom to top. These desired results also are enhanced by sloping the bottom of the kettle 13 upwardly front-to-rear of the fryer, as best seen in FIG. 4. To this end, the transversely extending portions of the bottom between the several walls 44, both those (45) defining the tops of the inverted channels 47 and those comprising the rearward extensions of the wall 49 defining the bottoms of the troughs 46, are given a rearward slope at an acute angle of 5 degrees above the horizontal.

This front-to-rear upward sloping of the bottom portion of the kettle 13 also facilitates complete combustion of the gas supplied by the Bunsen type burners comprising the burner means 14 of the preferred embodiment herein illustrated. As best seen in FIGS. 4 and 5, the burner means 14 includes a plurality of individual Bunsen type burners 53 disposed below, and directed upwardly toward, each of the inverted channels 47, with the burners 53 of each group that is associated with a said channel being disposed parallel to each other and spaced from the next adjacent burner. As best seen in FIG. 4, each burner 53 includes the usual gas tube 54, and each tube 54 of the group of burners disposed below a particular channel 47 is mounted upon, and connected in well known manner to, a separate, transversely extending supply pipe 55. Each pipe 55 thus supplies gas to a correspondingly positioned burner 53 in each of the several groups of burners which are associated, respectively, with the individual channels 47. One end of each of the supply pipes 55 is connected in well known manner to a gas manifold 56 which is secured in any suitable fashion to a bracket 57 mounted upon, and interiorly of, the casing 12. As seen in FIG. 4, the gas manifold 56 is disposed at the same slope as, or parellel to, the wall portions 45 of the kettle bottom.

In order to obtain maximum efficiency and facilitate a natural flow of the products of combustion, the tube 54 of the burners 53, which are directed upwardly toward their associated channels 47, are inclined rearwardly from the vertical so that their axes define an acute angle of 58 degrees with the previously described slope of the bottom of the kettle 13. This angle is that defined in FIG. 4 by the axis of a tube 54 and a line drawn from left to right through the centers of the several supply pipes 55. The aperture 33 in the bottom 18 of the casing 12 is sufficiently large to provide an ample supply of oxygen to the burner means 14, including primary air which is drawn into each mixing tube by the gas flowing from the tubes 54, and secondary air flowing upwardly into the inverted channels 47 around the individual burners. This secondary air is augmented by air drawn over the top of the control panel 21 and between the bottom of the latter and the front door 19, as well as by air that may be drawn forwardly through the aperture 32 in the rear wall 17 of the casing. In order to assure complete burning of the products of combustion before the same pass from the inverted channels 47 rearwardly into the flue means 51, radiant fin means 58 are mounted interiorly of the channels 47 adjacent the upper portions thereof. As shown in FIGS. 4 and 5, it is preferred that each such fin 58 comprise a metal strip secured in any suitable manner adjacent its upper edge along the central portion of the upper part of the inverted channel and having the main body portion thereof severed along substantially vertical parallel lines with the resulting separated portions twisted at an angle to their original plane.

Operation of the burner means 14 is controlled in well known manner to maintain cooking fat in the kettle 13 at a predetermined temperature in accordance with the setting of the thermostat control 22, the usual thermostat bulb being mounted in the kettle, as indicated at 59 in FIG. 4. Since this control of the burners will entail their being turned on and off automatically, as will their control by the timer 27, 28, a suitable pilot light 61 (FIG. 4) is provided as part of the burner means 14. It also is necessary to provide a convenient method of draining the cooking fat from the kettle 13, which is illustrated in FIG. 4 as a drain fitting 62, that includes any suitable valve means, mounted at the lowest point and extending forwardly from the bottom of the cool zone 52 for ready access when the front door 19 is opened.

From the preceding description, it will be readily apparent that the flames from the individual burners 53 are directed upwardly into their associate channels 47 and that, by virtue of the copious supply of air available, the nature of the burners employed, and the radiant fins 58, extremely rapid heating of the fat in the kettle 13 is obtained. The walls 44, 45 of the bottom portion of the kettle provide an unusually large area to effect direct transfer of the heat generated by the burner means 14 to the cooking fat. The angular disposition of the bottom portion of the kettle, in conjunction with the novel burner arrangement, assists materially in the desired complete combustion and, together with the lateral sloping of the walls 44, assures the generation of convection currents in the fat which flow in a counterclockwise direction, as seen from the right side of the fryer in FIG. 4. This desired effect also is enhanced by the structural arrangement which provides the cool zone 52 at the lower front portion of the kettle. That cool zone has the additional important function of providing a convenient location for the deposit of any foreign material or particels falling from the food being fried. One primary reason why the space 52 forms such a cool zone is because of the arrangement and location of the burner means 14, including the disposition of all of the individual burners 53 so as to direct their flames into the channels 47 and away from this space 52 at the front end of the kettle. Consequently, any crumbs, or the like, deposited in the cool zone 52 will have no deleterious effect upon the cooking fat and may readily be removed therefrom at any time.

The food supporting means 15 generally comprises means for conveniently supporting one or more baskets 63 and automatically lowering the same to immerse food contained therein into the cooking fat in kettle 13 and lifting the same therefrom at the end of a predetermined time interval. A typical basket 63 for receiving the food to be fried is illustrated in FIG. 2, and includes a forwardly extending handle 64 and a rounded hook or bracket 65 at its rear end. This bracket 65 is adapted to be engaged with a hanger rod 66 to support the basket thereon. As best seen in FIG. 4, the lower rear portion of the basket 63, or the lower end of the bracket 64, is adapted to rest against a transversely extending slide bar 67 when the bracket so hangs from the rod 66. As shown in FIG. 3, the hanger rod 66 and slide bar 67 are connected at their ends to a pair of vertical tie bars 68 which are similarly interconnected at their upper ends by a supporting rod 69. Since the rear wall 42 of the kettle 13 is disposed below the upper end of this basket supporting means, for reasons that will be more readily apparent from the following description, a cook may carelessly hang a basket 63 thereon, as by engaging its bracket 65 over the upper edge of the wall 42. For this reason, the supporting means also includes a stop bar 71 extending between the tie bars 68 somewhat below the supporting bar 69 for engaging the bracket 65 of any basket so hung, as the supporting means is lowered in the manner hereinafter described, so as to prevent damage to such basket or its supporting means.

The members 66–69, 71 thus comprise the basket hanger frame illustrated in FIG. 3, and this comprises part of the means for lowering and raising the baskets and is supported by a slide frame formed by a pair of vertical slide bars 72 which are interconnected at their upper ends by a transversely extending bar 73. Formed as a part of the bar 73, or rigidly secured thereto in any suitable manner, are a pair of forwardly extending hooks or brackets 74. The upper forward end portion of each of these brackets 74 is provided with a slot 75 for receiving the supporting rod 69 of the basket hanger frame. When so mounted, the slide bar 67 of this frame engages the forward surface of the rear wall 42 of the kettle 13, so that the weight of the baskets 63 and the food contained therein is not all applied as a bending force against the lowering and raising frame comprising the vertical slide bars 72. The vertical bars 72 are mounted in any suitable manner in the space provided between the rear walls 42 and 17 of the kettle and casing, respectively, and the lower portions of these vertical slide bars 72 are interconnected by a horizontal rail 76 (FIG. 5). Secured to, and depending from, the rail 76 is a bracket 77, the main portion of which extends horizontally in spaced relationship to the rail 76, so that 76, 77 comprise rail members defining a cam slot therebetween within which a roller, or the like, 78 is disposed. The roller 78 preferably is provided with end flanges 79 for engaging the front and rear surfaces of the rail members 76, 77, and is carried in well known manner on the outer arm of a crank 81 adapted to be rotated through suitable gear reduction means by an electric motor 82. The members 78, 79, 81 thus comprise eccentric means engageable with the rail members 76, 77 for lowering and raising the frame 72–74. This vertically movable frame also includes cam members 83 and 84 mounted, respectively, on and adjacent to the lower ends of the vertical slide bars 72. The cam member 83 is adapted, when the vertical frame reaches its lowermost position, to engage and open a normally closed microswitch 85. The cam member 84 normally maintains a second microswitch 86 open when the food supporting lowering and raising means is in raised position, and as the cam member 84 is moved downwardly from this uppermost position, it is disengaged from the microswitch 86 to enable the latter to open automatically in well known manner.

Figure 7:
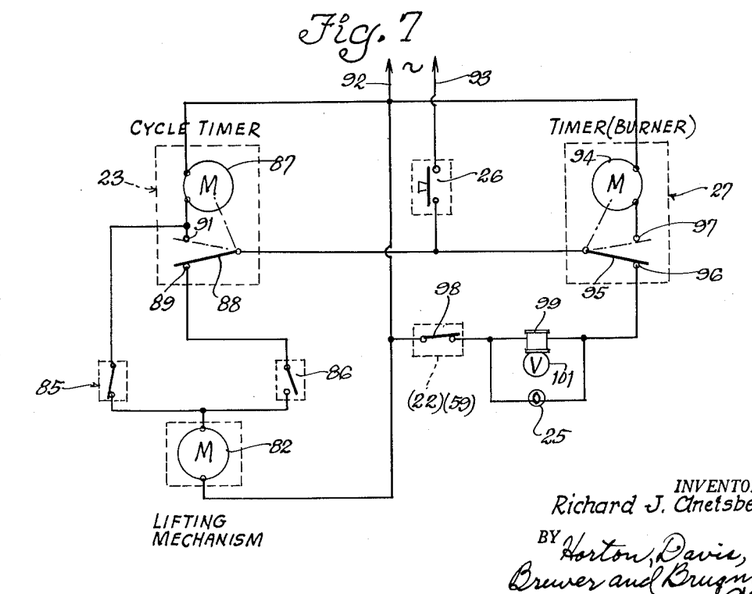
FIG. 7 is a wiring diagram of the electrical circuit employed in the preferred embodiment of the instant fryer.

Referring now to the wiring diagram of FIG. 7, the cycle timer 23 is shown as comprising a motor 87 and a double-throw switch having a contact 88 normally engaging a contact 89 and separated from a second contact 91. One side of the motor 87 is connected to one line 92 of a suitable source of electrical energy which includes a second line 93, and the latter may be connected to the other side of the motor 87 by engagement of the contact 88 with the contact 91. One side of the normally closed microswitch 85 is connected to the contact 91, while the other side thereof is connected to one side of the motor 82. The other side of the motor 82 is connected to the main line 92. One side of the normally open microswitch 86, like the switch 85, is connected to one end of the motor 82, and the other side of the switch 86 is connected to the contact 89.

As also will be noted from the wiring diagram of FIG. 7, the precook or burner-off timer 27 comprises a motor 94 and a double-throw switch having a contact 95 normally engaging a contact 96 and movable into engagement with a second contact 97. One side of the motor 94 is connected to the first line 92, while the other side thereof may be connected to the second line 93 through the contacts 95, 97 and the master switch 26. The thermostat 22, 59 includes a switch 98, one side of which is connected to the first line 92. The other side of the switch 98 is connected to the contact 96 of the timer 27 through a solenoid 99 for controlling a gas valve 101 which is connected in the gas line supplying the manifold 56 for the burner means 14. The heat indicating light 25 is connected in parallel with this solenoid 99. Energization of the solenoid 99 opens and maintains open the gas valve 101, and the latter is closed automatically in well known manner in response to deenergization of the solenoid.

In the normal condition of the burner timer, contacts 95, 96, complete a circuit through main switch 26, if it is closed, and the solenoid 99 and thermostat switch 98, if the latter is closed, to energize the solenoid 99 to open and maintain open the main valve 101 for the gas burners. This operating condition of the gas burners is indicated by the signal lamp 25 connected in parallel with the solenoid 99. When the burner timer button 28 (FIG. 1) is pushed to initiate a cooking cycle, the switch contacts 95, 96 (FIG. 7) are opened and 95, 97 closed. Opening of contacts 95, 96 de-energizes the solenoid 99 to cause the gas valve 101 to be closed, shutting off the burners. Closing of contacts 95, 97 energizes the timer motor 94. After the predetermined period of time for which the timer has been set has lapsed, the continuing operation of motor 94 automatically opens contacts 95, 97 and closes contacts 95, 96. This de-energizes the timer motor 94, returns the timer 27 to normal condition, and causes energization of solenoid 99 to open the main gas valve 101 to effect relighting of the burners.

When the cycle timer initiating control or starter button 24 (FIG. 1) is actuated, contact 88 is moved into engagement with 91 to complete a circuit through the main switch 26 from line 93 through the motor 87 to line 92 to energize the cycle timer motor 87. At the same time, a circuit is completed from line 93 through contacts 8, 91, microswitch 85 and lifting motor 82 to line 92 to energize motor 82. This results in lowering of the basket supporting frame, which moves cam 84 away from microswitch 86 (FIG. 5) to allow it to close. As the frame reaches its lowermost position, microswitch 85 is opened by cam 83 (FIG. 5) to deenergize the motor 82. At the same time, microswitch 86 is closed, but this does not affect the circuit to motor 82 because contacts 88, 89 are separated. At the end of the predetermined and present time interval, the continuing operation of timer motor 87 results in opening of contacts 88, 91 and closing of contacts 88, 89. The former deenergizes motor 87. Closing of contacts 88, 89, since microswitch 86 is then closed, results in energization of lifting motor 82 to raise the basket supporting frame. When this frame reaches its uppermost position, microswitch 86 is automatically opened by cam 84 to deenergize motor 82. At the same time, microswitch 85 is closed, since cam 83 has been moved out of engagement therewith, but this has no immediate effect because contacts 88, 91 are separated.

Figure 6:
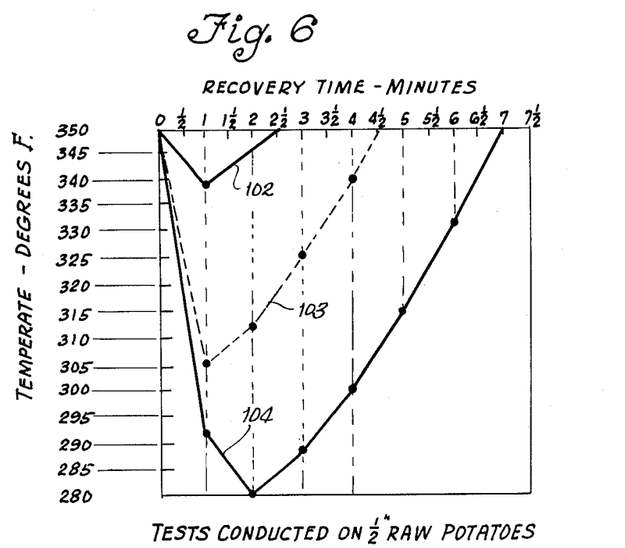
FIG. 6 is a comparison graph illustrating heat recovery times for different fryers and under different circumstances.

From the foregoing description, it will now better be appreciated why the semi-tube, deep fat fryer of this invention has been able to attain a material decrease in the heat recovery time in frying. The burner and kettle constructions contemplated, such as that illustrated in the instant drawings, result in a maximum transfer of heat to the cooking fat. This is graphically illustrated in FIG. 6 of the drawings, wherein the curve 102 represents the change in temperature of the cooking fat resulting from immersion of a specific load of raw potatoes (prepared for french-fries) into the fat which has an initial temperature of 350 degrees. The second broken line curve 103 in the graph of FIG. 6 represents the temperature changes with an identical load in a deep fat fryer of the same size or rating but of conventional construction, also with the fat therein at an initial temperature of 350 degrees. In both of these cases, as represented by the curves 102 and 103, the burners were permitted to continue operation at fully capacity. With respect to such use of a fryer constructed in accordance with the instant disclosure, as represented by the curve 102, it will be noted that the fat temperature dropped in response to the immerison of the potatoes to 338 degrees during the first minute, and that from that point, the recovery time required to bring the fat temperature back up to the initial 350 degrees was one and one-half minutes. In comparison with those results, the same test in a fryer of the same size of conventional construction resulted in a temperature drop of the fat in the first minute to 305 degrees. Thereafter, it required an additional three and one-half minutes to bring the temperature back up to the initial 350 degrees. It thus will be seen that the decrease in recovery time with the same work load and initial temperature was two minutes, or in the ratio of four and one-half to two and one-half. This is illustrated for the purpose of emphasizing the tremendous advantages obtainable with a deep fat fryer made acoording to the instant invention.

At the same time, the increase in heat transfer area in the kettle by virtue of this novel semi-tube construction has not introduced the cleaning problems which are confronted in connection with a full tube fryer. Also, the present construction results in all exposed surfaces being maintained at a sufficiently low temperature at all times to enable hand wiping, despite the material reduction in recovery time. The fuel efficiency is greatly increased, at the same time, by virtue of the specific relative angularity of the burners and the bottom portion of the kettle, as well as the provision of the radiant fins 58 which assure complete combustion.

Referring again to the graph of FIG. 6, the third curve 104 therein represents the temperature changes in the fat in the same fryer constructed in accordance with this invention as that resulting in curve 102, except that in the latter instance the burners were maintained on, while in the case represented by the lower curve 104, the burners were turned off as the potatoes were immersed in the fat and turned back on at the end of two minutes. That predetermined period of two minutes was effected by presetting of the burner-off timer 27. Consequently, immersion of the same work load as employed in the tests represented by curves 102 and 103, but with the burners of the instant fryer turned off, resulted in a drop from the initial fat temperature of 350 degrees to 292 degrees at the end of one minute and to a low of 280 degrees after two minutes of immersion. Functioning as previously described herein, the burner-off timer 27 then caused re-ignition of the burners which resulted in the fat temperature being brought back up to the initial 350 degree temperature in the following five minutes. This comprises the most satisfactory results possible, because during the first two minutes of that total seven minute interval, the interiors of the potatoes are thoroughly cooked to prevent sogginess and obtain interior crispness, and the final five minute portion of that interval causes uniform browning and crisping of the exteriors of the potatoes. It will be appreciated that the predetermined time interval during which the potatoes are immersed in the cooking fat will be required to be varied in accordance with the condition of the potatoes, their size and total weight. In the tests which were conducted resulting in the curves of the graph of FIG. 6, all of these factors were held constant, and potatoes with the same moisture content likewise were employed in each instance. The moisture content quite obviously also requires variation of the cooking time interval. The same desirable results are obtainable with other food products which it is desired to fry, such as chicken; but the time interval, as well as the predetermined period during which the burners are turned off, and the initial fat temperature, will vary with different products. These factors are well known, but the fryer of the instant invention facilitates programmed deep fat frying in a manner not heretofore available.

It will be appreciated that the operation above described which is represented by the lower curve 104 in the graph of FIG. 6 may be accomplished with a fryer constructed according to this invention by manually immersing the food to be fried and lifting the same from the kettle at the end of the preselected time interval. However, with the novel food receiving means hereinbefore described, including the means for lowering the food into the fat and automatically lifting the same out of the fat at the end of a predetermined time interval, production frying is very materially simplified and exactly identical results may be obtained repeatedly. All that is necessary after the desired cooking temperature has been set on the thermostat control 22 and the preselected times for cooking and burner shut-off set by means of the timers 23 and 27, respectively, is to place the food product in the basket or baskets 63, hang the same on the rod 66 and press the timer starter buttons 24 and 28. The burners will be turned off immediately and the food receiving means 63 lowered into the kettle 13 to immerse the food to be fried in the cooking fat. As soon as the preselected period of time for non-functioning of the burners has lapsed, the same will be reignited automatically in the manner hereinbefore specifically described. Thereafter, when the predetermined total cooking time interval has elapsed, the basket raising mechanism will function automatically, as described above in detail, to raise the baskets from their active full line position of FIG. 4 to their uppermost, inactive position shown in broken lines in that figure, wherein the same will be suspended above the cooking fat. It will be readily appreciated by one skilled in the art that this results in maximum and uniform production, the resulting products having both interior and exterior crispness, while being browned only to the desired degree. Once set or programmed during maximum production periods, all controls will remain constant and push button operation is all that is required.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described and shown in the drawings being merely a preferred embodiment thereof.

I claim:

1. A semi-tube, deep fat fryer, comprising a kettle having front, side and rear walls defining a cooking zone for receiving cooking fat up to a predetermined surface level, food supporting means adapted to be disposed in a lowermost position to immerse food supported thereby in said fat, said kettle having a bottom portion defining troughs extending front to rear of the fryer, terminating short of said front wall and disposed below said food supporting means when the latter is in said lowermost position, adjacent said troughs being separated by inverted channel means of the same length as said troughs, and wall sections closing the forward ends of said channel means to define, with said front wall, a cool zone at the lower forward part of the kettle, said troughs and channel means sloping upwardly from the front to the rear of the fryer, and burner means for heating the walls of said channel means to heat the cooking fat and disposed rearwardly of said cool zone.

2. A deep fat fryer according to claim 1, wherein said burner means comprises a plurality of upwardly directed gas burners disposed below each of said channel means.

3. A semi-tube, deep fat fryer, comprising a cooking fat kettle having a bottom portion sloping upwardly from front to rear with upright walls arranged in pairs to define open-top troughs and alternate channels and including means joining the upper edge portions of each said pair to close the top portions of said channels, burner means below said kettle for heating said channels to heat the cooking fat, the walls of each said pair being tilted toward each other from bottom to top so that said troughs increase in width upwardly, the front ends of said walls terminating in spaced relationship to, and rearwardly of, the front end of the kettle, and means joining the front ends of each pair of walls to close the forward ends of said channels.

4. A deep fat fryer according to claim 3, wherein said burner means comprises a plurality of Bunsen-type gas burners having upwardly extending tubes which are directed into said channels and are inclined rearwardly, whereby the forward part of said bottom portion comprises a relatively cool zone and the cooking fat circulates in a generally counter-clockwise direction, as viewed from the right side of the kettle.

5. A deep fat fryer according to claim 3, wherein said burner means comprises a plurality of Bunsen-type gas burners having tubes which are directed into said channels and inclined rearwardly, and food supporting means disposed above said channels.

6. A semi-tube, deep fat fryer, comprising a kettle having a bottom portion defining open-top, parallel troughs extending front-to-rear of the fryer and inverted channels separating adjacent said troughs, burners disposed below said channels, and timer means selectively settable manually for operation for a predetermined period of time to maintain said burners turned off and automatically operable at the end of the selected period of time to turn said burners on.

7. A semi-tube, deep fat fryer, comprising a kettle having a bottom portion defining open-top, parallel troughs extending front-to-rear of the fryer and inverted channels separating adjacent said troughs, said bottom portion sloping upwardly front-to-rear of the fryer and said channels terminating at their front ends in spaced relation to the front wall of said kettle, a plurality of Bunsen type burners disposed below and directed upwardly into each of said channels with their axes inclined rearwardly from the vertical, and timer means selectively settable manually for operation for a predetermined period of time to maintain said burners turned off and automatically operable at the end of the selected period of time to turn said burners on.

8. A semi-tube, deep fat fryer, comprising a kettle for receiving cooking fat up to a predetermined level and having a bottom portion defining open-top troughs extending front-to-rear separated by inverted channels, burner means below said kettle for heating said channels to heat said cooking fat, food receiving means disposed above said kettle, means for supporting said food receiving means, means for lowering said supporting means to immerse food carried by said receiving means into said cooking fat and operable automatically after a predetermined time interval to raise said supporting means to lift said food receiving means above said predetermined fat level means operable to turn off said burner means and means to turn the same on automatically after a predetermined period of time.

9. A deep fat fryer having fast temperature recovery time and providing relatively cool exposed surfaces, comprising a cooking fat kettle having a bottom portion with inverted parallel channels laterally spaced from each other and inclined upwardly from front to rear at a slope defining an acute angle with the horizontal, and a body with outwardly extending upper edge portions; a casing surrounding said kettle in spaced relationship relative thereto and engaging said edge portions to support the kettle therein; and burner means mounted in said casing below said kettle, comprising a plurality of Bunsen type burners disposed below each said channel and spaced from each other longitudinally of the channels, with each said burner including a tube having its axis inclined rearwardly to define a predetermined acute angle with said slope and directed upwardly into its associated said channel.

10. A deep fat fryer having fast temperature recovery time and providing relatively cool exposed surfaces, comprising a cooking fat kettle having a bottom portion with inverted parallel channels laterally spaced from each other and inclined upwardly from front to rear at a slope defining an acute angle with the horizontal, and a body having side walls with outwardly extending upper edge portions and a front wall spaced forwardly from said channels and forming a forwardly and upwardly inclined apron at its upper end; a casing surrounding said kettle in spaced relationship relative thereto and engaging said edge portions to support the kettle therein; and burner means mounted in said casing below said kettle, comprising a plurality of Bunsen type burners disposed below each said channel and spaced from each other longitudinally of the channels, with each said burner including a tube having its axis inclined rearwardly to define a predetermined acute angle with said slope and directed upwardly into its associated said channel.

11. A deep fat fryer, comprising a kettle for receiving cooking fat up to a particular surface level, a cabinet surrounding said kettle in spaced relationship relative thereto, said kettle having outwardly extending upper edge portions supportingly engaged by said cabinet, burner means disposed within said cabinet below said kettle for heating said fat, food receiving means normally disposed in raised position above said kettle and said fat surface level, raising and lowering mechanism for supporting said receiving means in raised position and automatically lowering the same to immerse food carried thereby into said fat for a predetermined time interval, means for initiating operation of said mechanism to lower said food receiving means and selectively variably settable control means to raise the same automatically at the end of a selected time interval, and means to turn off said burner means as said mechanism lowers said food receiving means and timer means selectively settable to turn on said burner means automatically after a selected period of time and before the end of said selected time interval.

12. In a deep fat fryer having a fat receiving cooking kettle and food receiving means, means for lowering said food receiving means into and raising the same out of said kettle, comprising a vertically movable frame for supporting said food receiving means, an electric motor, operating mechanism for raising and lowering said frame including means movable in response to energization of said motor, and control means to cause energization of said motor to effect lowering of said frame, and to cause de-energization of said motor in response to completion of such lowering of said frame, and selectively variably settable means to cause reenergization of said motor automatically at the end of a predetermined time interval of motor deenergization to effect raising of said frame; burner means for heating said kettle, and means to turn off said burner means during lowering of said frame and timer means selectively settable to turn on said burner means automatically after a selected period of time and before the end of said predetermined time interval.

13. A deep fat fryer, comprising a kettle for receiving cooking fat up to a predetermined surface level, food supporting means adapted to be disposed in a lowermost position to immerse food supported thereby in said fat, burners disposed below said kettle for heating said cooking fat, and timer means selectively settable manually for operation for a predetermined period of time to maintain said burners turned off and automatically operable at the end of the selected period of time to turn said burners on.

References Cited by the Examiner

UNITED STATES PATENTS

| | | | |
|---|---|---|---|
| 1,277,158 | 8/1918 | Wall | 185—27 |
| 1,506,113 | 8/1924 | Dearing | 185—27 |
| 2,337,481 | 12/1943 | Lowe | 99—408 |
| 2,360,727 | 10/1944 | Shaw | 126—391 |
| 2,433,134 | 12/1947 | Long | 126—391 |
| 2,558,077 | 6/1951 | Fitzgerald | 99—336 |
| 2,766,680 | 10/1956 | Tagliaferri | 99—336 X |
| 2,875,682 | 3/1959 | Smoot | 99—411 |
| 2,947,240 | 8/1960 | Bloxsom | 99—333 |
| 2,978,975 | 4/1961 | Rossi | 99—403 X |
| 3,060,922 | 10/1962 | Wilson | 126—391 |
| 3,071,064 | 1/1963 | Horvath | 99—336 |

FOREIGN PATENTS

| | | |
|---|---|---|
| 318,153 | 2/1957 | France. |
| 738,120 | 8/1943 | Germany. |
| 486,426 | 11/1953 | Italy. |

WALTER A. SCHEEL, *Primary Examiner.*

J. D. BEIN, GEORGE NINAS, Jr., JEROME SCHNALL, ROBERT PULFREY, *Examiners.*

UNITED STATES PATENT OFFICE
CERTIFICATE OF CORRECTION

Patent No. 3,217,633                           November 16, 1965

Richard J. Anetsberger

It is hereby certified that error appears in the above numbered patent requiring correction and that the said Letters Patent should read as corrected below.

Column 2, line 6, for "illustration" read -- illustrated --; column 4, line 19, for "portion" read -- portions --; column 5, line 35, for "resulting" read -- resultingly --; line 72, for "particels" read -- particles --; column 7, line 67, for "8" read -- 88 --; column 8, line 1, for "present" read -- preset --; line 30, for "fully" read -- full --; column 9, line 45, after "for" insert -- total --; column 10, line 36, after "each" insert -- said --.

Signed and sealed this 27th day of September 1966.

(SEAL)
Attest:

ERNEST W. SWIDER                                   EDWARD J. BRENNER
Attesting Officer                                       Commissioner of Patents